Patented Oct. 17, 1950

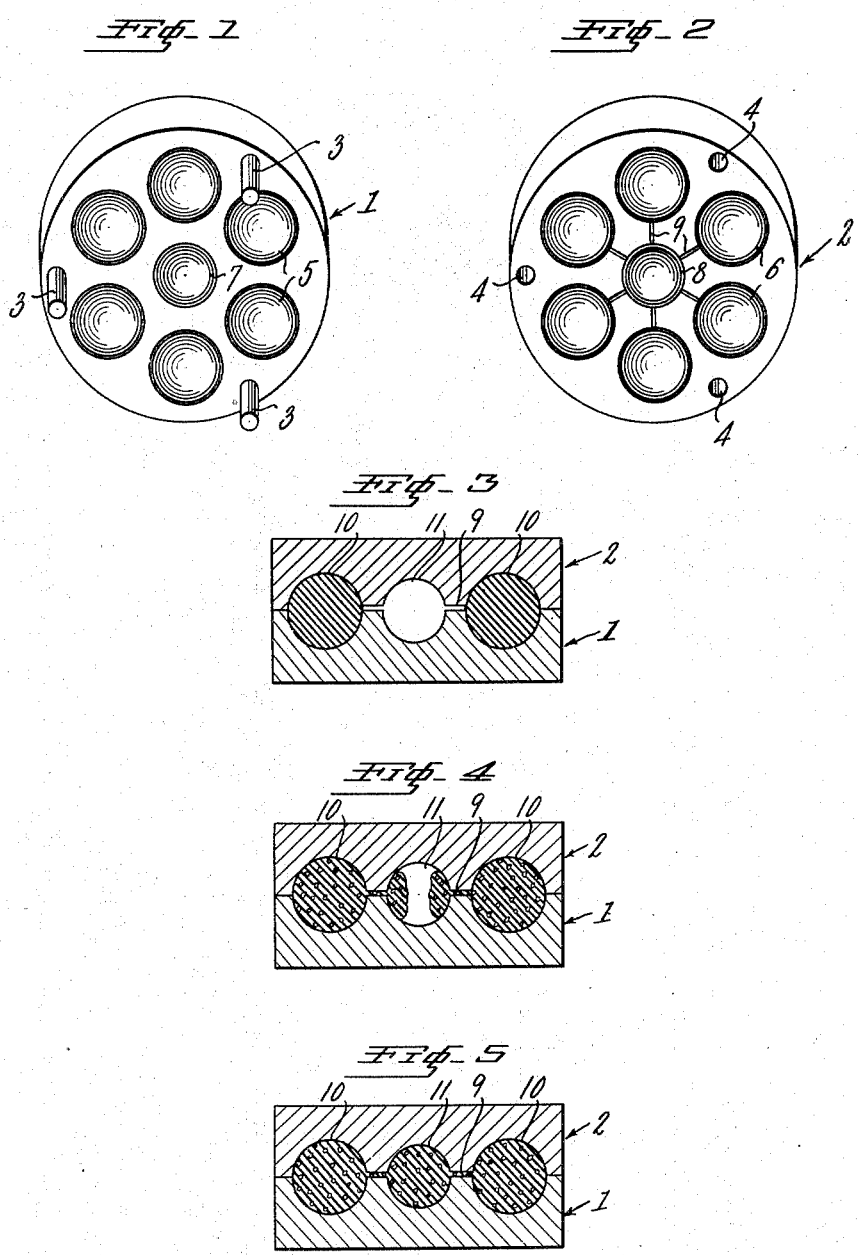

2,525,880

UNITED STATES PATENT OFFICE 2,525,880

METHOD OF MOLDING POROUS ARTICLES

John E. Feldman, Garfield, N. J., assignor to United States Rubber Company, New York, N. Y., a corporation of New Jersey Application January 30, 1948, Serial No. 5,283

10 Claims. (Cl. 18—55)

This invention relates to a method for making expanded thermoplastic articles. More particularly this invention relates to the production of shaped articles of expanded vinyl resin, especially plasticized polyvinylchloride. The invention relates to the production of closed-cell gas-expanded articles wherein the cells do not communicate with one another.

Heretofore, one practice in the art of producing shaped articles of expanded vinyl resins, such as polyvinyl chloride, has been as follows: A mixture of polyvinyl chloride and a plasticizer is formed and a blowing agent is introduced. A mold having the shape of the desired article is filled with the resin mixture containing the blowing agent and, after the mold is closed tightly by the application of high pressure, the composition is "preheated," that is, heat is applied to the mold to cause the blowing agent to decompose or gasify. A high external pressure is maintained on the mold in an effort to hold it closed against the internal pressure of the generated gas. After the blowing agent has gasified, the mold is cooled, the pressure is released, and the article is removed from the mold. At this stage the article has been only partially expanded, and the gas is contained in very small pores within the plasticized resin. The thus preheated and cooled article may be readily caused to expand further to many times its original size, to form a very light cellular material while still retaining its shape, by heating it, as by placing it in warm water or in heated air or in any other heated fluid medium in which it is free to expand, so that the thermoplastic resin softens and the pressure of the gas causes the pores to become greatly enlarged. Upon cooling, the article retains its expanded shape.

In practical operation it is found that when using the method just described it is generally not possible to maintain the external pressure on the mold during the heating operation sufficiently high to prevent amounts of the stock or of the gas from being violently expelled at the junction of the mold sections. Since a gas cannot be confined at a finite pressure in zero volume, the pressure of the gas generated by the blowing agent continues to build up within the mold until it exceeds the pressure exerted on the mold by the hydraulic press, whereupon the mold opens slightly and gas and plastic are expelled violently. The expulsion of even a very small amount of material in this manner results in the formation of ugly recessions or splits at the mold seam on the surface of the expanded article.

If it is attempted to reduce the pressure of the gas in the mold by filling the mold only partially with the expansible resin paste or plastisol, so as to provide free space for retention of the generated gas, it is found that the finally expanded article is not coherent, that is, large gas pockets are formed and the expanded article may split apart.

One solution to this problem is described in the copending application of Omar H. Smith, Serial No. 5,249 filed of even date herewith, which discloses the prevention of excessive pressure buildup by the use of a step-pressure method which allows from 2 to 15 per cent of the stock to escape from the mold during the initial portion of the preliminary heating operation and thereafter applies a higher pressure to the mold to prevent further leakage of the stock.

The present invention comprises a new method of molding whereby relief of excess pressure is effected by controlled removal of a small amount of the stock from the main mold cavity or cavities to an auxiliary cavity during the initial stages of the decomposition of the blowing agent. By the practice of my invention the entire preforming operation may be carried out at a constant moderate applied pressure.

In the accompanying drawing Figs. 1 and 2 are perspective views of cooperating mold halves constructed in accordance with my invention, and Figs. 3, 4 and 5 are vertical central sectional views through a mold constructed in accordance with my invention and showing sequential operating steps in the production of expanded articles by the present invention.

The essential features of the mold used in practicing my invention are (1) a cavity in which the expandable stock is shaped, (2) a small interconnecting channel through which stock is forced to flow when the blowing agent begins to decompose, and (3) an auxiliary cavity to receive the expelled stock. The mold cavity or cavities and the auxiliary cavity are defined by a plurality of mold sections adapted to be held together by pressure in the usual manner during the molding operation. The volume of the auxiliary cavity should be such that a minor proportion only, usually not less than 2 per cent and not more than 15 per cent by volume, of the stock flows from the shaping cavity or cavities into the auxiliary cavity.

The method of making articles of expanded cellular plastic materials of the present invention comprises the steps of (A) substantially filling the mold cavity or cavities with the plastic mix containing the blowing agent, (B) heating this mix in the mold cavity or cavities to effect partial generation of gas from the blowing agent and consequent expansion of the mix, which causes escape of a minor proportion of the expanding mix from the mold cavity or cavities through the connecting passageway or passageways into the closed auxiliary cavity until the auxiliary cavity is filled whereupon the internal pressure in the mold cavity or cavities builds up by reason of inability of any substantial further portion to escape, and (C) then continuing the heating step at the resulting higher internal pressure so as to complete the decomposition of the blowing agent while further escape is prevented. The mold-closing pressure, i. e., the external pressure applied to the mold sections as distinguished from the internal pressure of the mix, is almost invariably held constant throughout. Furthermore the maximum external pressure required is considerably lower than the excessively high pressure required to give even poor results in the conventional method. Thus my invention has the important practical advantages of producing satisfactory articles at lower mold-closing pressures, and of being entirely automatic, which simplifies operation and allows simpler constant-pressure equipment to be used.

After the decomposition of the blowing agent is complete the shaped article or articles formed in the mold cavity or cavities are cooled in the mold, then removed from the mold and expanded to final form in the usual manner by heating outside the mold. It is within the scope of my invention and, in fact, is preferred that the size and shape of the overflow cavity and the amount of overflow be such that there is produced in the overflow cavity itself a shaped article which, like the articles formed in the main cavities, may be cooled, removed from the mold and expanded by heating outside the mold.

Generally the amount of stock allowed to escape into the auxiliary cavity ranges from 2 to 15 per cent by volume of the volume of the main mold cavity or cavities. Preferably the volume of the auxiliary cavity is such that from 5 to 10 per cent, say 7 per cent, of the stock flows thereinto.

Figs. 1 and 2 of the drawing portray a mold consisting of cooperating mold halves 1 and 2, mold half 1 being provided on its closing face with aligning pins 3 adapted to be received by corresponding holes 4 in mold half 2. Six spherical main mold cavities are formed by hemispherical recesses 5 and 6 in the closing faces of mold halves 1 and 2. A spherical escape or relief cavity is formed centrally of the main mold cavities by hemispherical recesses 7 and 8 in mold halves 1 and 2. The main mold cavities are connected to the auxiliary cavity by relief passageways 9 which are shown as hemicylindrical channels or grooves machined in the closing face of the mold half 2. The central cavity formed by recesses 7 and 8, initially empty, receives the overflow from the adjacent mold cavities. If at any time it should be desired to reduce the proportion of overflow, this may be done by placing small objects such as steel balls of various sizes in the central cavity. In general, the auxiliary cavity will be designed to have such volume that just the desired amount of overflow occurs without use of the balls; thus, it usually has a volume of from 2 to 15 per cent of the volume of the main mold cavity or cavities.

Fig. 3 shows the mold halves 1 and 2 closed and the main mold cavities 10 (of which two are shown in this view) filled with the expandable plastic mix, preferably a plastisol containing a blowing agent, the auxiliary cavity 11 being empty. Fig. 4 shows the beginning of the preheating operation, wherein the resin mix expands and flows through the relief passageways 9 into the auxiliary cavity 11. Fig. 5 shows the completion of the preheating step, the auxiliary cavity 11 being filled. Incidentally, an expanded spherical article may be made in the auxiliary cavity 11 as well as in the main mold cavities 10.

In operation the main mold cavities are filled with the expandable plastic mix, preferably the expandable plastisol described more fully hereinafter, and the mold is placed in a suitable hydraulic press. A pressure sufficient to hold the mold closed throughout the preforming operation, usually from 6,000 to 25,000 p. s. i. based on the projected area of the mold and auxiliary cavities, is applied and maintained while the mold is heated to a temperature at which the blowing agent will decompose and at which the plastic is sufficiently fluid to undergo expansion, this temperature being sufficient in the case of a plastisol to effect gelatinization thereof. Temperatures of 140° to 180° C. are generally employed. The pressure of the gas released by the blowing agent forces a portion of the stock to flow from each of the filled mold cavities into the auxiliary cavity, thus preventing the development of excessively high disruptive internal pressure which in prior art practice would cause the mold to open slightly and expel stock violently. The duration of the initial portion of the heating step during which such escape takes place is such as to permit only partial decomposition of the blowing agent. Heating is continued after the auxiliary cavity is filled for such a period of time as to effect complete or substantially complete decomposition of the blowing agent. After the decomposition of the blowing agent has reached the desired degree of completion, say in about 8 minutes, the mold is cooled, the pressure is released, and the shaped articles are expanded to final form in the usual manner, e. g., by immersion in hot water.

In molding plastics or rubber, it is common practice to charge more than enough material to fill the mold cavity. As pressure is applied to the mold the excess material is expelled as flash. The usual provision for flash in the conventional mold does not serve the purpose of the present invention since once the mold is closed tightly no more expandable material can escape except by violent expulsion after the blowing agent generates an excessively high pressure. The small vent provided in some conventional molds would permit the entire charge to escape under the pressure of the generated gas. Thus previous molding techniques will not accomplish the objectives of the present invention. Moreover my invention has a further advantage in that an expanded article can be produced in the auxiliary cavity whereby wastage is prevented.

While the present invention is particularly applicable to the production of articles of expanded plasticized polyvinyl chloride, it may be applied to other commercially available thermoplastic materials, particularly resins such as copolymers of vinyl chloride containing a major proportion of copolymerized vinyl chloride (for example, vinyl chloride-vinyl acetate copolymers, especially those made from 85 to 95 per cent of vinyl chloride and correspondingly from 15 to 5 per cent of vinyl acetate), and mixtures of polyvinyl chloride with other thermoplastic resins. Other commercially available resins such as polyvinyl acetate, polyvinyl butyrate, etc., polyvinyl alcohol, polyvinyl acetals such as polyvinyl formal, polyvinyl butyral, etc., polyvinylidene chloride, copolymers of vinylidene chloride and vinyl chloride, polyvinyl aromatic compounds such as polystyrene, polydichlorostyrene, poly-alphamethylstyrene, etc., acrylic compounds such as polymethylacrylate, polyethylacrylate, polymethylmethacrylate, etc., likewise may be employed.

An excellent blowing agent for use in the process is $\alpha,\alpha'$-azobisisobutyronitrile. Other nitrogen-producing blowing agents may be used, examples being diazoaminobenzene, 1,3-bis(o-xenyl)-triazene, 1,3-bis(p-xenyl)-triazene, etc. Nitrogen-producing blowing agents are preferred for expanding soft materials such as plasticized polyvinyl chloride since nitrogen gas, because of the large proportion of nitrogen in the outside air, diffuses out of the cells the most slowly after the pressure in the cells is reduced to atmospheric pressure. Blowing agents which produce other gases such as ammonia or carbon dioxide, which tend to diffuse out of the cells rapidly, may be employed with resin compositions which are hard and rigid enough after cooling to retain their cellular structure against the pressure of the atmosphere. Commonly used blowing agents which may be employed are, e. g., sodium bicarbonate and oleic acid; ammonium carbonate; mixtures of ammonium chloride and sodium nitrite, etc.

Dioctyl phthalate and tricresyl phosphate are illustrative of the plasticizers which may be employed in my process with polyvinyl chloride or copolymers made with vinyl chloride as one monomer. Other plasticizers may be employed, for example, dibutyl phthalate and other high-boiling esters, ethers, ketones, and other plasticizers known to the industry may be used. Mixtures of plasticizers may be used.

The quantity of plasticizer used should be sufficient to form a butter-like plastisol or paste. The proportion of plasticizer employed may range from 0.5 to 4 parts per one part of the resin. Usually a proportion of from 65 to 100 parts of plasticizer per 100 parts by weight of polyvinyl chloride is employed.

The quantity of the blowing agent employed will vary with the density or degree of cellularity desired in the final article and the particular blowing agent employed. Generally from 12 to 40 parts, for example, of $\alpha,\alpha'$-azobisisobutyronitrile per 100 parts by weight of resin are suitable.

It is also advantageous to employ a small quantity of a heat or light stabilizer, such as 2 to 5 parts of calcium stearate per 100 parts by weight of polyvinyl chloride.

The plasticizer, the powdered polyvinyl chloride and other ingredients may be mixed at room temperature to form a butter-like plastisol or paste which is capable of being gelled by heating a short time at elevated temperatures (e. g., 200° to 350° F.).

The plasticizer, as is well known in the resin industry, should be of such nature and should be used in such amount that upon heating of the mixture of powdered resin and plasticizer (i. e., the plasisol) to elevated temperatures at which the blowing agent generates gas, the plasticizer will dissolve the resin and give a solution or gel which upon cooling yields a product which is solid at ordinary temperatures such as those to which the expanded product is subjected in service.

The time and temperature of the heating operation will vary with the blowing agent employed. The temperature should be sufficiently elevated to both decompose the blowing agent and cause the plasticizer to dissolve the resin. When using the preferred blowing agent, $\alpha,\alpha'$-azobisisobutyronitrile, the heating step may be carried out at a temperature from 220° to 350° F. for from 6 to 15 minutes.

The size of the passageway or passageways connecting the mold cavity or cavities to the relief or auxiliary cavity in accordance with my invention is dependent upon a combination of several different factors among which are the temperature of the mold and the viscosity characteristics of the molding material. If the passage is too large, a defect may be visible on the surface of the article where the plastic has flowed from the mold cavity too rapidly. On the other hand, the passage should not be so small that the plastic mixture cannot flow out of the mold cavity under the moderate pressure generated in the initial stage of the heating operation, since the mixture may be at least partially gelled soon after the initial stage of the heating operation. The high resistance to flow of the gelled material may then result in excessively high pressures in the mold cavity, with consequent violent expulsion of material from the mold and defects in the article. I have found that when using polyvinyl chloride plastisols the size of the passageway should be such that the auxiliary cavity becomes filled up and further flow of plastic ceases within from ½ to 2 minutes from the beginning of the preheating operation. When producing practice golf balls of expanded plasticized polyvinyl chloride in accordance with my invention I have obtained very satisfactory results employing a passageway having a cross-sectional area of from 0.0002 to 0.0004 square inch when using a mold such as that illustrated in the drawing with main mold cavities of about $^{11}/_{16}$" in diameter. For example, such a mold may have half-round grooves 9 which are 0.20 inch in length and have a radius of 0.014 inch, corresponding to a cross-sectional area of ca. 0.0003 square inch.

*Example*

As a specific illustration of the practice of the invention, the following ingredients were mixed on a three-roll paint mill until a smooth mixture of butter-like consistency was obtained:

| | Parts by weight |
|---|---|
| Powdered polyvinyl chloride | 100 |
| Tricresyl phosphate | 85 |
| $\alpha,\alpha'$-azobisisobutyronitrile | 20 |
| Calcium stearate | 3 |

The twelve hemispherical main cavities of the mold, designated 5 and 6 in Figs. 1 and 2 of the drawing and having a diameter of $^{11}/_{16}$", were filled entirely with the above paste, while the central overflow cavity hemispheres 7 and 8, which together had a volume equal to about 7% of the total volume of all the main cavities, were left empty. The mold halves were placed together and inserted in a hydraulic press having steam heated platens. A pressure of 7,000 p. s. i. based on the projected area of the mold cavities (including the auxiliary cavity) was applied while the mold was heated to 330° F. During the heating operation the blowing agent decomposed and about 7% of the material charged to the mold cavities passed into the overflow cavity during the first two minutes of the heating operation. The plastisol gelled during the heating operation. The duration of the heating was from 6 to 8 minutes. The mold was then cooled by running cold water through the press platens for about 8 minutes; the pressure was then released and the solid spheres of plastic were removed from the mold. The spheres were then placed in hot water at 185° F. causing them to expand to about 16 times the volume of the mold cavities. The cellular spheres had smooth, flawless surfaces and were free from internal discontinuities. The density of the expanded articles was about 4.0 lbs./cu. ft.

The term "plastisol" is used herein with the meaning which has become well-established in the art. See for example the article "A New Technique in Coatings" by G. M. Howell and R. W. Quarles appearing in "Official Digest," published by the Federation of Paint and Varnish Production Clubs, issue #263, December 1946 which contains a thorough exposition of the nature and properties of plastisols. Reference may also be made to Modern Plastics Encyclopedia, 1947, vol. 1, pages 140 and 484, published by Plastics Catalogue Corporation, New York, and to British Patent No. 500,298 which however effects the gelatinization of the plastisol without the application of pressure.

Having thus described my invention, what I claim and desire to protect by Letters Patent is:

1. A method of making an article of closed-cell gas-expanded plasticized thermoplastic resinous material comprising substantially filling a mold cavity, formed by a sectional mold, with an expandable resin mixture comprising a plastisol of particles of a thermoplastic resin and a plasticizer therefor which is capable upon heating of dissolving said resin to form a gel, said mixture also containing a chemical blowing agent, heating said mixture in the mold cavity to effect partial generation of gas from said blowing agent and expansion of said mixture, allowing the pressure generated by said gas to force a minor proportion of the expanding mixture to flow from said mold cavity through a relatively small tubular connecting passageway into a closed auxiliary cavity also formed by said sectional mold until said auxiliary cavity is filled, thereafter continuing the heating to complete the decomposition of the blowing agent, applying external mold-closing pressure to the mold sections sufficient to hold the mold cavity and the auxiliary cavity completely closed throughout said heating steps, and, after decomposition of the blowing agent is complete, cooling and removing the shaped article from the mold cavity, and expanding it to final size by heating it outside the mold.

2. The method of claim 1 wherein the amount of said mixture forced to flow from said mold cavity into said auxiliary cavity is from 2 to 15 per cent of the volume of said mold cavity.

3. A method of making articles of closed-cell gas-expanded thermoplastic resinous material comprising substantially filling a plurality of mold cavities formed by a sectional mold with an expandable resin mixture comprising a plastisol of particles of a thermoplastic resin and a plasticizer therefor which is capable upon heating of dissolving said resin to form a gel, said mixture also containing a chemical glowing agent, heating said mixture in said mold cavities to effect partial generation of gas from said blowing agent and expansion of said mixture, allowing the pressure generated by said gas to force from 2 to 15 per cent by volume of the mixture to flow from each of said mold cavities through relatively small tubular connecting passageways into a single closed initially unfilled auxiliary cavity having an initial free volume of from 2 to 15 per cent of the total volume of said mold cavities, said auxiliary cavity also being formed by said sectional mold, until said auxiliary cavity is filled, thereafter continuing the heating to complete the decomposition of the blowing agent, applying external mold-closing pressure to the mold sections sufficient to hold the mold cavities and the auxiliary cavity completely closed throughout said heating steps, and, when decomposition of said blowing agent is complete, cooling and removing the shaped articles from said mold cavities, and expanding said articles to final size by heating them outside the mold.

4. A method of making a closed-cell gas-expanded thermoplastic resin article comprising substantially completely filling a mold cavity formed by a sectional mold with an expandable resin mixture comprising a plastisol of particles of a thermoplastic resin and a plasticizer therefor which is capable upon heating of dissolving said resin to form a gel and also containing a chemical blowing agent, preheating said mixture in the mold sufficiently to effect partial generation of gas from said blowing agent and gelatinization of said plastisol while applying to the mold sections sufficient pressure to hold the mold closed, allowing the pressure of said gas to force from 2 to 15 per cent by volume of the mixture to flow from said mold cavity through a connecting passageway into a closed auxiliary cavity formed by said sectional mold during the initial portion of said preheating step until said auxiliary cavity is filled, maintaining the mold-closing pressure throughout such that the mold is held completely closed, and thereafter cooling and removing the shaped article from the mold, and expanding it to final size by heating it outside the mold.

5. The method of claim 4 wherein a closed-cell gas-expanded thermoplastic resin article is produced in said auxiliary cavity, is cooled and removed, and is expanded by heating outside the mold.

6. The method of claim 4 wherein said resin is polyvinyl chloride and wherein the proportion of said plasticizer ranges from ½ to 4 parts by weight per one part of said resin.

7. The method of claim 4 wherein said passageway is so dimensioned that said auxiliary cavity is filled within from ½ to 2 minutes from the beginning of said preheating step.

8. A method of making a closed-cell gas-expanded plasticized resinous article which comprises providing a sectional mold forming at least one mold cavity and an auxiliary cavity and having a relatively small tubular passageway connecting said mold cavity with said auxiliary cavity, said mold cavity and said auxiliary cavity being completely closed except for said passageway therebetween, the auxiliary cavity having at the start of the heating step hereinafter-mentioned a free volume of from 2 to 15% of the total volume of said mold cavity, substantially filling only said mold cavity with a plastisol of a powdered thermoplastic resin and a plasticizer therefor capable upon heating of dissolving said resin to form a gel which upon cooling yields a product solid at ordinary temperatures, said plastisol also containing a chemical blowing agent, heating the mixture in said mold cavity to effect partial generation of gas from said blowing agent and expansion of the mixture, allowing the pressure of the gas generated by said blowing agent to force from 2 to 15% by volume of the mixture to flow from said mold cavity through said passageway into said auxiliary cavity until said auxiliary cavity is filled, holding said mold completely closed during said heating step by exerting external mold-closing pressure on the mold sections, thereafter continuing to heat the mixture at the resulting higher internal pressure developed when no further portion of the mixture can escape from said mold cavity, while continuing to hold said mold completely closed by exerting external mold-closing pressure on the mold sections, until decomposition of said blowing agent is complete, cooling, removing the formed article from said mold cavity, and expanding it to final size by heating outside the mold.

9. The method of claim 8 wherein said mold-closing pressure is maintained throughout said heating at a constant value so slow that violent expulsion of said mixture from said mold cavity would occur in the absence of said auxiliary cavity.

10. The method of claim 8 wherein said passageway is very small in cross-sectional area compared to the cross-sectional area of the mold space and is so small that the mixture cannot flow therethrough from said mold cavity so rapidly as to leave an objectionable defect on the surface of the article molded in said mold cavity but large enough that the mixture can flow therethrough and fill said auxiliary cavity before said plastisol has gelled.

JOHN E. FELDMAN.

REFERENCES CITED

The following references are of record in the file of this patent:

UNITED STATES PATENTS

| Number | Name | Date |
|---|---|---|
| 1,525,126 | Goldstein | Feb. 3, 1925 |
| 1,597,761 | Burt | Aug. 31, 1926 |
| 1,952,528 | Bedford | Mar. 27, 1934 |
| 2,283,316 | Cooper | May 19, 1942 |
| 2,315,366 | Daley | Mar. 30, 1943 |
| 2,400,091 | Alfthan | May 14, 1946 |